(12) United States Patent
Bunsmann et al.

(10) Patent No.: US 6,648,405 B2
(45) Date of Patent: Nov. 18, 2003

(54) VEHICLE ROOF HAVING AT LEAST TWO RIGID ROOF COMPONENTS

(75) Inventors: Winfried Bunsmann, Bissendorf (DE); Klaus Russke, Bissendorf (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 10/194,670

(22) Filed: Jul. 12, 2002

(65) Prior Publication Data

US 2003/0010250 A1 Jan. 16, 2003

(30) Foreign Application Priority Data

Jul. 12, 2001 (DE) .......................... 201 11 650

(51) Int. Cl.[7] ................................. B60J 7/00
(52) U.S. Cl. .................................... 296/213
(58) Field of Search .................. 296/213, 216.09, 296/220.01, 108, 107.04, 107.05

(56) References Cited

U.S. PATENT DOCUMENTS 5,727,839 A * 3/1998 Ruhringer et al. .......... 296/213
5,961,177 A * 10/1999 Caye et al. ................. 296/213
6,270,154 B1 * 8/2001 Farber ........................ 296/213
6,332,645 B1   12/2001 Schwarz ................. 296/216.09
2003/0010250 A1   1/2003 Bunsmann et al.

FOREIGN PATENT DOCUMENTS

| DE | 392 40 36 | 10/1990 |
| DE | 44 43 525 C1 | 2/1996 |
| DE | 197 56 021 C1 | 12/1998 |
| DE | 199 24 792 C1 | 8/2000 |

* cited by examiner

Primary Examiner—Dennis H. Pedder
(74) Attorney, Agent, or Firm—Michael J. Striker

(57) ABSTRACT

A vehicle roof has at least two rigid roof components which are tiltable and foldable away rearwardly in an opening operation, a profiled sealing element provided at least between the roof components and extending transversely to a vehicle on a frontal edge of a first one of the roof components, the first roof component being furnished with an associated collecting channel for collecting water that runs off when the first roof component is moved, the profiled sealing element incorporating a channel that is connected with the collecting channel, the further channel providing at least one orifice via which water is in the collecting channel is transferred to the further channel as the first roof component is moved.

12 Claims, 6 Drawing Sheets

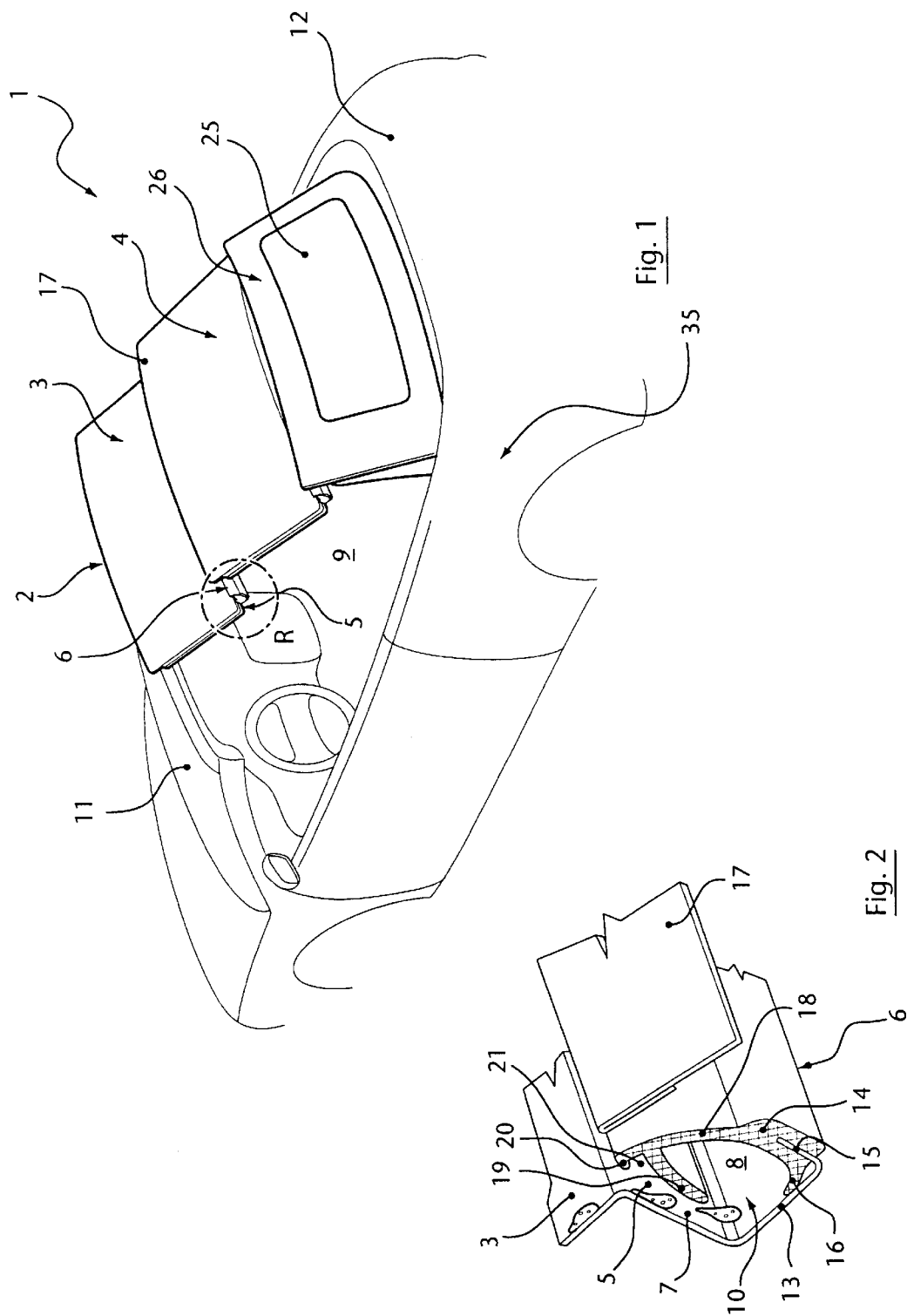

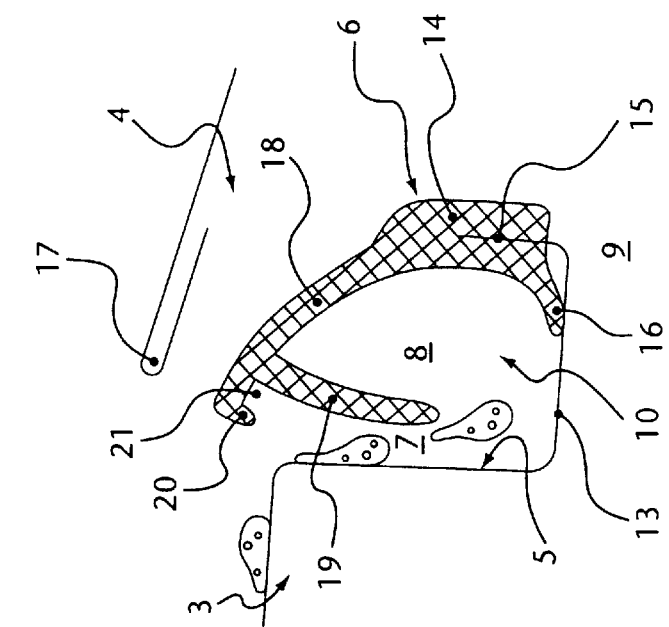
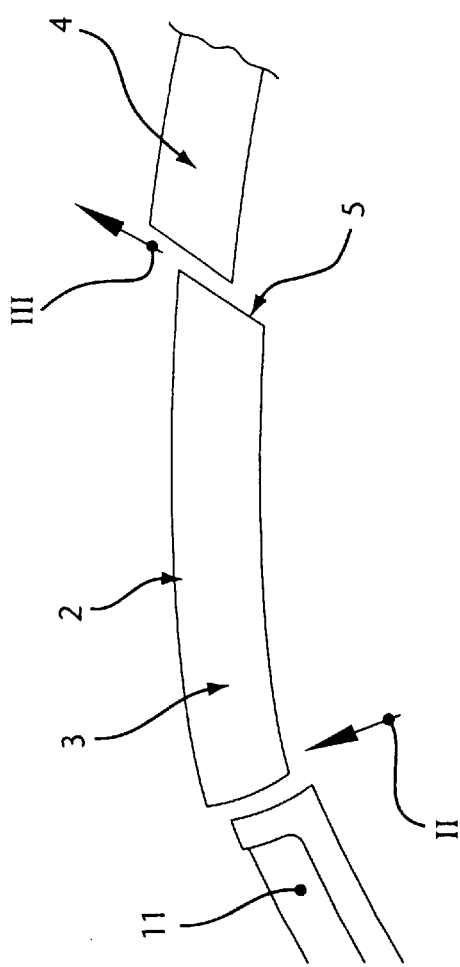
Fig. 4

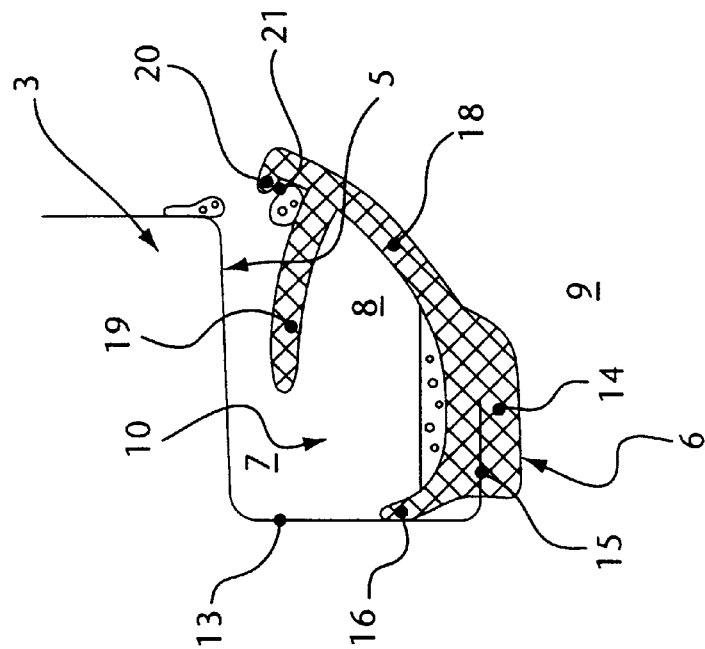
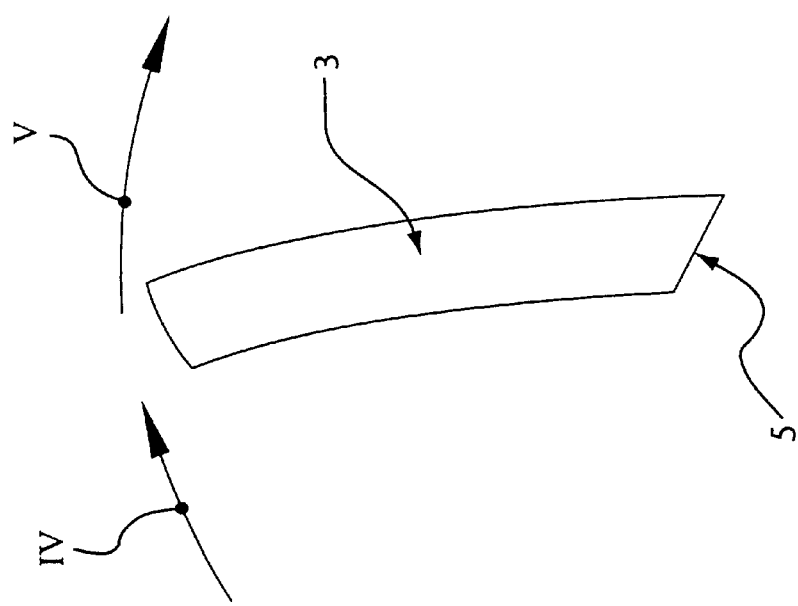
Fig. 5

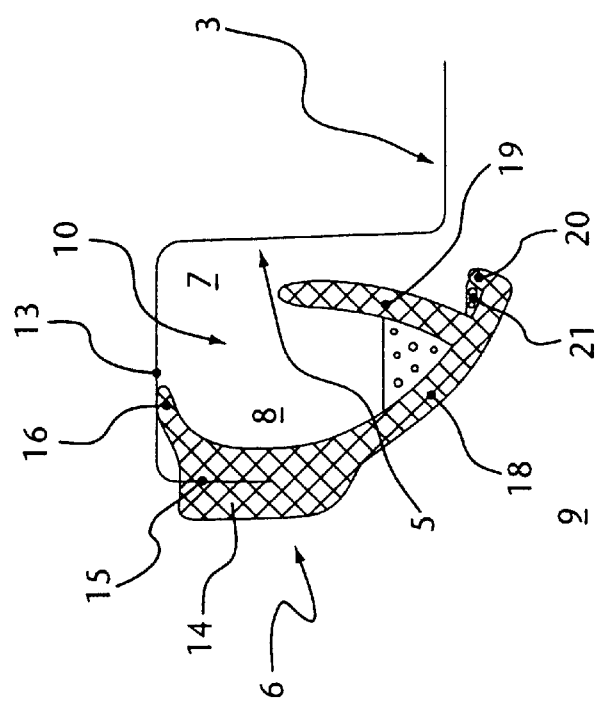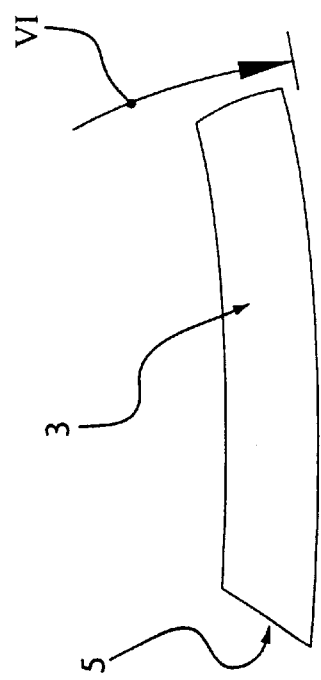
Fig. 6

VEHICLE ROOF HAVING AT LEAST TWO RIGID ROOF COMPONENTS

BACKGROUND OF THE INVENTION

The invention relates to a vehicle roof having at least two rigid roof components.

A vehicle roof having at least two tiltable and slidable rigid cover elements is known from German patent document DE 199 24 792 C1. The cover elements serve to selectively close or at least partially expose a roof opening. Gutters are provided laterally to and extending the length of the roof opening. A bead-shaped seal is arranged transversely on the leading side of one cover element in the direction of travel, which forms a sealing closure between adjacent cover elements when the roof is closed. A primary gutter and a secondary gutter are provided in front of the bead-shaped seal. The two gutters are arranged such that a cascade is formed, and the extremities of the primary and the secondary gutter open into the gutters extending lengthwise along the sides of the roof opening. In this way, any water running off when the cover elements are extended is transported way.

The primary gutter is formed integrally with the bead-shaped seal and the secondary gutter is conformed as a U-shaped rail that is connected by a forward section to the underside of a cover element. The bead-shaped seal is affixed to the U-shaped rail.

German patent document DE 44 43 525 C1 describes a roof arrangement for closing a roof aperture in a vehicle, wherein an elastic sealing member is arranged on a water draining device of a rear roof component and incorporates an integrally conformed, elastically deformable sealing section. The sealing section is shifted by a border of a roof component that is movable in conjunction with an opening or closing movement of the roof component between a tensionless, upwardly extended rest position providing splash protection and a tensioned position in which the water draining device is covered.

A leading frontal surface of a rear segmental roof component is furnished with a forwardly oriented ridge-like prolongation as an extension of the underside, the free extremity of which is curved upwardly to form an engaging lip in direction to a ridge-like prolongation of the other segmental roof section. An angular profile is realized by a frontal edge of the segmental roof section, the prolongation and the engaging lip, thereby forming an upwardly open channel for a water drainage system. An elastic sealing member made from rubber is attached on the engaging lip of the water drainage system by means of a flange configuration and secured thereto. The elastic sealing member is produced in a single piece and has a form that extends the full length of the engaging lip, that is to say the full breadth of the segmental roof section and the corresponding roof aperture of the vehicle.

In addition, a vehicle roof having at least two tiltable and slidable rigid cover elements is known from German patent document DE 197 56 021 C1. Each of these cover elements is furnished with a projecting sealing element along the respective leading edge, which element fits beneath the rear edge of the forwardly adjacent cover element when the cover elements are in the closed position.

The sealing element is furnished on its front edge with a prominent sealing lip, which in combination with a sealing member defines an upwardly open water collection cavity. The water that is collected in this water collection cavity may be forwarded into lateral water channels in known manner.

All the roof arrangements and sealing means intended to seal individual roof elements described in the above and known from the prior art share the same drawback, namely that the water collection channels provided for collecting water which may be on said roof elements only fulfil their function as far as to a certain maximum pivoting angle of the roof elements or cover elements. As the pivoting angle increases, the water that has collected in the water collection channels disadvantageously spills out and runs into the interior of the vehicle because all the channels are U-shaped.

SUMMARY OF THE INVENTION

Accordingly, it is an object of the present invention to provide a vehicle roof of the type described in the introduction, in which the water that runs off individual roof components, especially while opening the vehicle roof, is effectively prevented from entering the vehicle interior even for large pivoting angles of the roof components.

In keeping with this object and with others which will become apparent herein after, one feature of the present invention resides in a vehicle roof having at least two rigid roof components which are tiltable and foldable away rearwardly in an opening operation, wherein at least between the roof components a profiled sealing element extending transversely to the vehicle is provided on a frontal edge of a first roof component, and the first roof component is furnished with an associated collecting channel for collecting water that runs off when the first roof component is moved, and wherein the profiled sealing element incorporates a channel that is connected with the collecting channel, said channel providing at least one orifice via which water that is in the collecting channel is transferred to said channel as the first roof component is moved.

The embodiment of the profiled sealing element with the channel according to the invention presents a sealing arrangement that forms even for large pivoting angles of the roof components a channel, from which water that has collected cannot escape into the vehicle interior while an opening operation of the vehicle roof.

This arrangement also takes into account the fact that water on the roof components runs off more abundantly at the start of an opening operation. With the configuration of the profiled sealing element according to the invention, collected water is advantageously prevented from spilling because the water is able to enter but unable to exit the channel due to the at least approximately spiral shaped cross-section of the profiled sealing element.

Other advantageous embodiments of the invention and the novel features which are considered characteristic for the prevent invention are set forth in particular in the appended claims. The invention itself, however, both as to the construction and its method of operation, together with additional objects and advantages thereof, will be best understood from the following description of specific embodiments when read in connection with accompanying drawings.

The drawing, the description and the claims contain numerous features in combination. A person skilled in the art will also appreciate the features individually to advantage, and will be able to conceive of other practical combinations on the basis thereof.

BRIEF DESCRIPTION OF THE DRAWINGS

The drawings shown an exemplary embodiment of the invention.

In the drawings

FIG. 1 shows a highly schematic perspective view of a vehicle having two rigid roof components that are tilted and folded rearwardly in an opening motion;

FIG. 2 shows a closer detail of the profiled sealing element designated in FIG. 1 by area R;

FIG. 4 shows a side view of the vehicle roof of FIG. 3 at the start of the opening operation;

FIG. 5 shows a schematic side view of the first roof component in the vehicle roof of FIGS. 3 and 4, with the first roof component having reached pivoting angle of 90°;

FIG. 6 shows a schematic side view of the first roof component of FIG. 5, with the first roof component having reached a pivoting angle of 180°, whereby the profiled sealing element in the corresponding position is shown separately on a larger scale;

DESCRIPTION OF THE PREFERRED EMBODIMENTS

Figure 3:
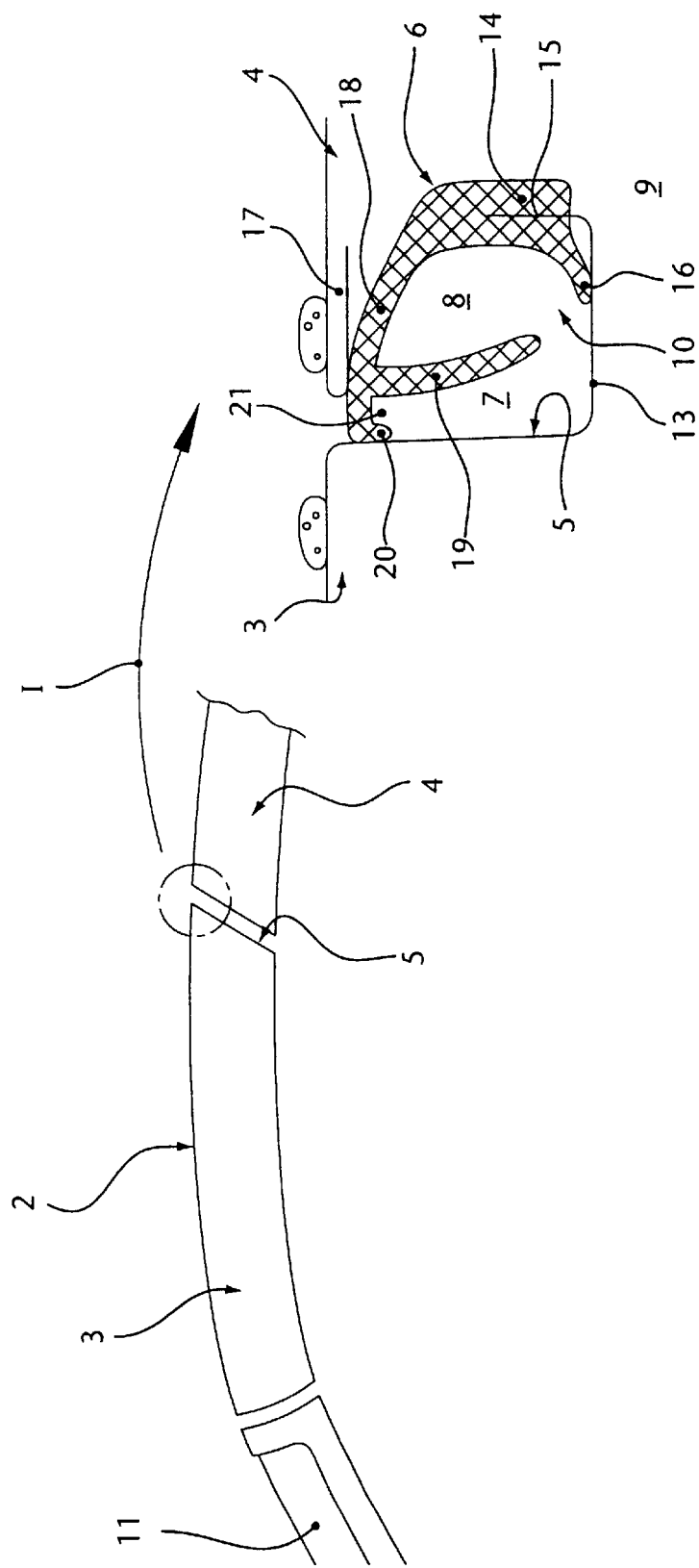
FIG. 3 shows a highly schematic side view of a vehicle roof, in which the area of the vehicle roof where the profiled sealing element is located is shown separately on a larger scale.

FIG. 1 shows a vehicle 1 equipped with a vehicle roof 2 that may be opened in multiple stages and that includes rigid roof components 3, 4 which are tilted and folded rearwardly during opening. A profiled sealing element 6 is provided between roof components 3, 4 on a frontal edge 5 of first roof component 3, extending transversely to first roof component 3 and thus also to the direction of travel.

FIG. 2 is a detailed view of the area designed in FIG. 1 by R, showing that first roof component 3 is furnished with an association collecting channel 7 for trapping water that runs off the first roof component when that component is moved. The profiled sealing element 6 incorporates a channel 8 that is connected or contiguous with collecting channel 7 and located above collecting channel 7 when the first roof component 3 is in the closed position, and that is furnished with a slot 10 which faces towards a vehicle interior 9 when the vehicle roof 2 is closed, and into which water is deposited from collecting channel 7.

FIGS. 3 to 6 each show a highly schematic side view of a portion of the vehicle roof 2 during an opening operation. For each of the individual opening stages, the corresponding detailed views of the profiled sealing element 6 are shown on a larger scale. Arrows I to IV in FIGS. 3 to 6 respectively show the direction of movement of the first roof component 3 and the second roof component 4 during the opening operation.

In FIG. 3, the initial direction of movement of both roof components 3, 4 is shown, reflected by arrow I. Both roof components 3, 4 are initially moved away from a windshield 11 of vehicle 1 towards a tail 12 of the vehicle. As shown in the detail view of FIG. 3, the profiled sealing element 6 is then in its sealing position between the two roof components 3, 4, and serves as a cover for the groove-shaped collection channel 7. The profiled sealing element 6 is disposed on an extension 13 of first roof component 3 that forms the collection channel 7, and is seated with a thick segment 14 over a ridge 15 of the extension 13 that presents in some form a U-shaped leg, or is located thereonto, and intrudes into collecting channel 7 with a lip 16 that is conformed on the thick segment 14 of the profiled sealing element 6. With a first mantle section 18 mantling the U-shaped cross-section of the collecting channel 7, and with a second mantle section 19 that extends from the first mantle section 18 towards the "bottom" of the collecting channel 7, whereby the slot 10 remains between the second mantle section 19 and the bottom of the collecting channel 7, the profiled sealing element 6 forms the channel 8.

As is shown by arrows II, III in FIG. 4 indicating the directions of movement of the two roof components 3, 4, as the roof begins to open the roof components 3, 4, are shifted upwardly from the vehicle interior 9 with an at least approximately slight incline. At the same time, a plate-shaped extension 17 having a rodlike cross-section and being conformed on the upper side of the second roof component 4 is raised away from the profiled sealing element 6. Hereby the first mantle section 18 of the profiled sealing element 6, which is pressed by the second roof component 4 against the frontal edge 5 of the roof component 3 to seal the gap between the two roof components 3, 4 when the vehicle roof 2 is in the closed position, is raised away from the frontal edge 5, and thereby opens an at least slot-like entry into the collecting channel 7. This allows water that is on the first roof component 3 to run into the collecting channel 7. At the same time, the first mantle section 18 acts as a splash guard for the vehicle interior 9 of the vehicle 1.

FIG. 5 shows the first roof component 3 in a pivoted position of about 90° relative to the closed position, and as is shown in the detail view of the profiled sealing element 6, the water that initially ran into the collecting channel 7 is now contained in the channel 8 of the profiled sealing element 6. Since water can no longer run into the collecting channel 7 with the first roof component 3 in this position, the first mantle section 18 provides at its extremity facing the frontal edge 5 of the first roof component 3 a sealing lip 20. The sealing lip 20 extends in the same direction as the second mantle section 19 and in combination therewith forms a collecting groove 21 for water on the first roof component 3 for a pivoting range of the first roof component 3 between approximately 70° and 200°.

In order to avoid diverting an excess of water into the collecting channel 21, which is smaller than the collecting channel 7 and the channel 8, provision may be made to pause for a bit the opening movement before the first roof component 3 reaches the vertical position, to allow as much water as possible to run into collecting channel 7 and channel 8.

FIG. 6 illustrates a pivoted position of the first roof component 3 roughly corresponding to a pivoting angle of 180°, in which the water initially collected in the collecting channel 7 is now in the channel 8. In this position, a connecting section between the first mantle section 18 and the second mantle section 19 of the profiled sealing element 6 is shown to form a bottom of the channel 8.

Figure 7:
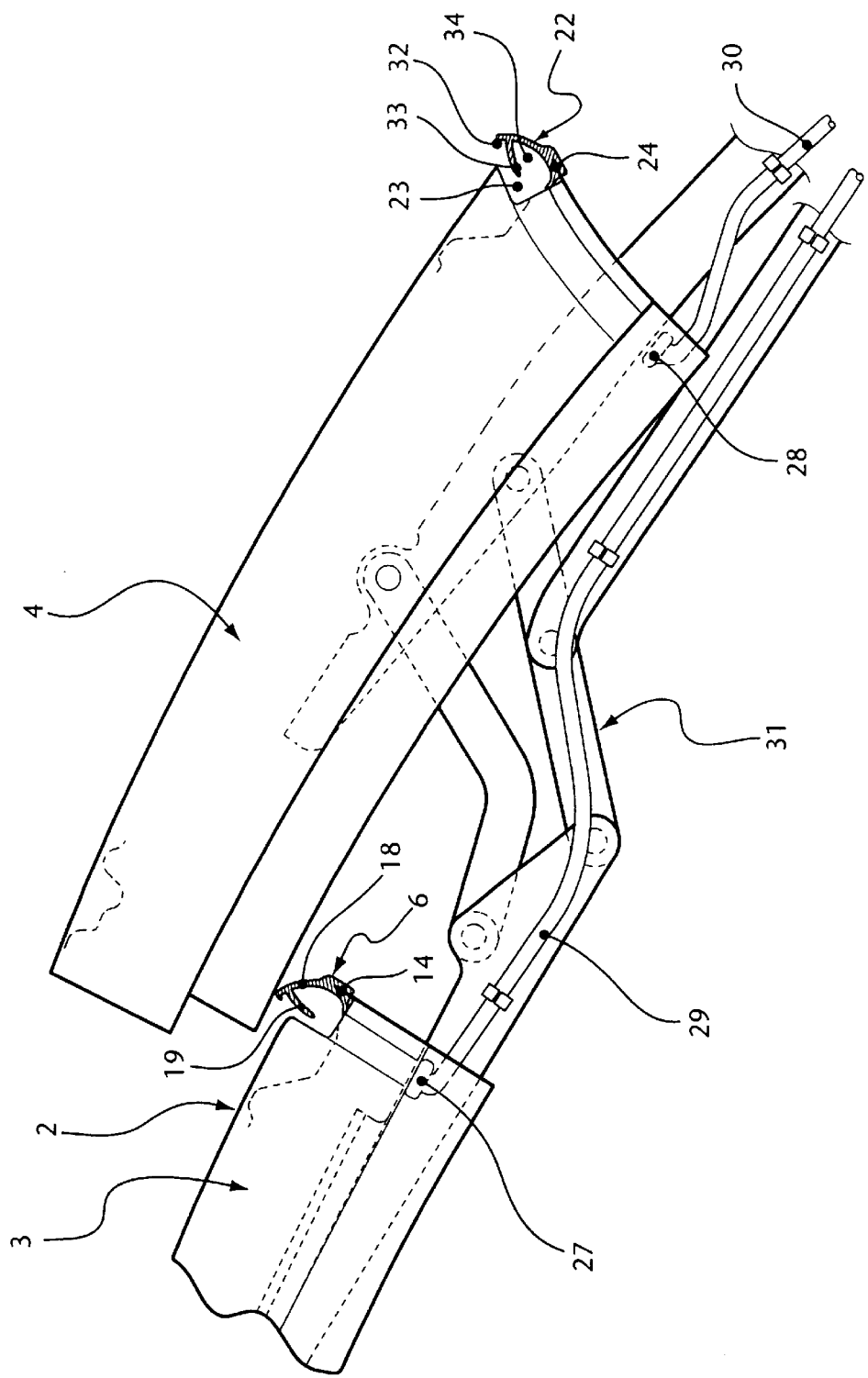
FIG. 7 shows a more detailed side view of a section of the vehicle roof illustrating a rod assembly of the vehicle roof and water drainage channels that lead away from the profiled sealing element.

The described functioning method of the profiled sealing element 6, which is arranged on the first roof component 3, applies in similar manner to an additional profiled sealing element 22 shown in FIG. 7, which is arranged on the second roof component 4. The second roof component 4 is also provided with a collecting channel 23 on its back end. The collecting channel 2 is constructed identically to the collecting channel 7 on the first roof component 3. As with the embodiment of the profiled sealing element 6, the additional profiled sealing element 22 has a sealing lip 32 and a channel 34 that is formed by a mantle section 33 corresponding to the mantle section 19.

The additional profiled sealing element 22 is located on a flange 24 of the collecting channel 23 and thus seals the second roof component 4 with respect to a rear roof component 26 holding a rear window as shown in FIG. 1. As soon as the second roof component 4 is opened with respect to the rear roof component 26, the profiled sealing element 22 moves into an upright position, catching water that is still on the second roof component 4 and is running towards the rear. This water is led into the collecting channel 23 of the second roof component 4.

The water in collecting channels 7, 23 flows toward the outer sides of the vehicle due to the curvature or convexity of the vehicle roof 2. From there, the water is led through sealing end pieces 27, 28 into the water drainage tubes 29, 30 or water drainage channels which are arranged on either side of the roof components 3, 4 and which are also connected to the sealing end pieces 27, 28.

The appropriate flexible water drainage tubes 29, 30 are secured laterally to elements of a rod assembly 31 of the vehicle roof 2, and are placed in suitable manner along a vehicle body 35 shown in FIG. 1, or are inserted thereinto and passed therethrough.

As soon as the roof components 3, 6 pass through an approximately vertical position during an opening operation, the water in the collecting channels or in channel 8 can no longer flow out through the water drainage tubes 29, 30 since the curvature of the collecting channels 7, 23 means that in the middle of the vehicle the collecting channels 7, 23 are positioned below the level at which water will flow from the sealing end pieces into the water drainage tubes. If the dividing line between the two roof components 3, 4 does not extend perpendicularly to the centre plane of the vehicle, this point may also be reached before or after the roof components 3, 4 reach the vertical position. When the vehicle roof 2 is open any residual 8, 34 can evaporate while the roof components are desposed in a storage room for the roof of the vehicle.

Water that does not run off into the water drainage tubes 29, 30 in time is trapped in the channels 8, 34. If the sizes of collecting channels 7, 23 and channels 8, 34 are modified appropriately, the water drainage tubes 29, 30 may be omitted.

Of course it will be evident to a person skilled in the art that the embodiment of the collecting channel in combination with a profiled sealing element as shown in FIGS. 1 to 7 may be modified so that the collecting channel is conformed integrally with the profiled sealing element and the profiled sealing element is secured directly to a frontal edge of a roof component.

It will be understood that each of the elements described above, or two or more together, may also find a useful application in other types of constructions differing from the types described above.

While the invention has been illustrated and described as embodied in vehicle roof having at least two rigid roof components, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A vehicle roof, comprising at least two rigid roof components which are tiltable and foldable away rearwardly in an opening operation; a profiled sealing element provided at least between said roof components and extending transversely to a vehicle on an edge of a first one of said roof components, said first roof component being furnished with an associated collecting channel for collecting water that runs off when said first roof component is moved, said profiled sealing element incorporating a further channel that is connected with said collecting channel, said further channel providing at least one orifice via which water that is in said collecting channel is transferred to said further channel as said first roof component is moved.

2. A vehicle roof as defined in claim 1, wherein said orifice is formed as a slot facing into a vehicle interior when said roof component is closed.

3. A vehicle roof as defined in claim 1, wherein said profiled sealing element has a part which at least partially forms as a cover for said collecting channel.

4. A vehicle roof as defined in claim 1, wherein said profiled sealing element is arranged on an extension of said first roof component.

5. A vehicle roof as defined in claim 4, wherein said extension of said first roof component is a collecting groove.

6. A vehicle roof as defined in claim 1, wherein said further channel is provided in one piece with said profiled sealing element.

7. A vehicle roof, comprising at least two rigid roof components which are tiltable and foldable away rearwardly in an opening operation; a profiled sealing element provided at least between said roof components and extending transversely to a vehicle on an edge of a first one of said roof components, said first roof component being furnished with an associated collecting channel for collecting water that runs off when said first roof component is moved, said profiled sealing element incorporating a further channel that is connected with said collecting channel, said further channel providing at least one orifice via which water that is in said collecting channel is transferred to said further channel as said first roof component is moved, said profiled sealing element having a first mantle section which is pressed by a second one of said roof components against said edge of said first roof component to seal a gap between said two roof components where said first roof component is in a closed position.

8. A vehicle roof as defined in claim 7, wherein said profiled sealing element has a second mantle section that extends from said first mantle section toward said collecting channel and defines said further channel in combination with said first mantle section.

9. A vehicle roof as defined in claim 8, wherein said at least one orifice is formed between a free end of said second mantle section and a bottom of said collecting channel.

10. A vehicle roof, comprising at least two rigid roof components which are tiltable and foldable away rearwardly in an opening operation; a profiled sealing element provided at least between said roof components and extending transversely to a vehicle on an edge of a first one of said roof components, said first roof component being furnished with an associated collecting channel for collecting water that runs off when said first roof component is moved, said profiled sealing element incorporating a further channel that is connected with said collecting channel, said further channel providing at least one orifice via which water that is in said collecting channel is transferred to said further channel as said first roof component is moved; and means for forming water drainage channels, said collecting channel and said further channels being provided with sealing end pieces in a region of outer sides of a vehicle, said sealing end pieces being connected to said water drainage channels, said water drainage channels, being secured to members of a rod assembly, having free ends which are fed at least to a vehicle body.

11. A vehicle roof as defined in claim 9, wherein said open formation between said free end of said second mantle section and said bottom of said collecting channel is a slot.

12. A vehicle roof as defined in claim 7, wherein said first mantle section in a region adjacent to said edge of said first roof component is provided with a sealing lip which extends toward the vehicle interior when said first roof component is in the closed position, and in combination with said first mantle section forms a collecting groove for water for a pivoting range of said first groove component.

* * * * *